(12) United States Patent
Branigan et al.

(10) Patent No.: US 11,828,930 B2
(45) Date of Patent: Nov. 28, 2023

(54) VARIABLE RADIUS MIRROR

(71) Applicant: II-VI Delaware, Inc., Wilmington, DE (US)

(72) Inventors: Kyle Branigan, Pittsburgh, PA (US); Gregg E. Davis, Gibsonia, PA (US); Scott Schnur, Cabot, PA (US)

(73) Assignee: II-VI DELAWARE, INC., Wilmington, DE (US)

( * ) Notice: Subject to any disclaimer, the term of this patent is extended or adjusted under 35 U.S.C. 154(b) by 694 days.

(21) Appl. No.: 16/552,388

(22) Filed: Aug. 27, 2019

(65) Prior Publication Data

US 2021/0063725 A1 Mar. 4, 2021

(51) Int. Cl.
 *G02B 26/08* (2006.01)
 *G02B 26/06* (2006.01)
 *G02B 5/10* (2006.01)

(52) U.S. Cl.
 CPC ......... *G02B 26/0825* (2013.01); *G02B 26/06* (2013.01); *G02B 5/10* (2013.01)

(58) Field of Classification Search
 CPC .... G02B 26/06; G02B 26/08; G02B 26/0825; G02B 26/0841; G02B 5/10; G02B 19/00; G02B 19/0023; G02B 19/0076; G02B 19/0042; G02B 7/183; G02B 7/1815; G02B 23/20; G02B 23/06; F24S 20/55; F24S 20/80; F24S 23/81; F24S 23/70
 USPC ........ 359/845–847, 849, 862, 868, 291, 399
 See application file for complete search history.

(56) References Cited

U.S. PATENT DOCUMENTS

| | | | |
|---|---|---|---|
| 4,119,366 A | 10/1978 | Lemaitre | |
| 6,877,869 B2* | 4/2005 | Exel | G02B 7/1815 359/845 |
| 2007/0165312 A1* | 7/2007 | Aoki | G02B 27/0068 359/846 |
| 2014/0346156 A1 | 11/2014 | Bischof | |
| 2014/0368939 A1* | 12/2014 | Andreasen | G02B 26/0825 356/610 |

FOREIGN PATENT DOCUMENTS

| | | | | |
|---|---|---|---|---|
| DE | 10052249 A1 * | 4/2002 | | G02B 26/0825 |
| DE | 102005030001 B4 | 4/2008 | | |

OTHER PUBLICATIONS

English translation of DE 10052249. (Year: 2002).*

* cited by examiner

*Primary Examiner* — Jie Lei
(74) *Attorney, Agent, or Firm* — Blank Rome LLP

(57) ABSTRACT

A variable radius mirror includes a mirror element having a deformable face with an outer surface incorporating a reflective element. The deformable face is deformable in response to a pressure applied by a pressure medium acting on an inner surface of the deformable face. A ring extends around a perimeter of the deformable face and protrudes from the inner surface of the deformable face. The mirror element further includes at least one of a plurality of steps recessed at different depths into the inner surface of the deformable face, a cooling cavity having a pair of manifolds between the outer surface and the inner surface of the deformable face, and a sidewall of the ring having a curved inner surface and a curved outer surface.

28 Claims, 5 Drawing Sheets

VARIABLE RADIUS MIRROR

BACKGROUND OF THE DISCLOSURE

Field of the Disclosure

The present disclosure relates generally to a variable radius mirror and, in particular, to a variable radius mirror for use with laser optics systems.

Description of Related Art

A variable radius mirror (VRM) is a form of an adaptive optic element used in industrial laser applications to control the convergence and/or divergence of a laser beam. A VRM is configured to vary a radius of curvature of a reflective mirror surface by deflecting or flexing a deformable face having the mirror surface via selective actuation of an actuator, such as via delivery of pressurized air to a cavity behind the mirror surface, to control where a laser beam comes to focus as the beam propagates.

There are many competing performance requirements that govern design of VRMs. A large curvature range is desirable in VRM design because it allows for more adjustment of focal position and spot size while making the overall system design more compact and lightweight. The requirement for a large curvature range must be balanced with material characteristics. In addition, VRMs used in high power laser optics systems need to dissipate heat efficiently from the mirror surface. These performance requirements are balanced by material selection and physical design to achieve the desired VRM characteristics.

Due to these and other design criteria, existing VRMs are associated with a number of structural and performance deficiencies. Achieving a large curvature range is challenging and requires an increasingly thin deformable face. While it is desired to have the deformable face bend under pressure in a spherical manner, such bending may happen only over a small portion in the center of the deformable face before the radius of curvature departs in a parabolic or catenary manner at outer edges of the deformable face. An existing solution for correcting these irregularities of the mirror surface is by contouring the back of the deformable face with a complex 3D curve. However, complex 3D curves are difficult to manufacture and verify for dimensional accuracy.

Stresses on the deformable face during manufacture of the VRM and/or from connecting the mirror cap having the deformable face onto a rigid mirror base can pass distortions through to the mirror surface. Existing VRMs compensate for such distortions by combining the mirror cap and the mirror base as a matched pair. However, due to high tolerance specifications, it can be difficult to match the mirror cap with the mirror base, especially if the mirror cap has a complex 3D curve on an inside surface of the deformable face.

Cooling channels are provided as close as possible to the mirror surface in order to increase heat transfer. However, the pressure within the cooling channels and thermal gradients across the deformable face due to irregular cooling medium flow within the cooling channels can impart various irregularities to the mirror surface, thereby impacting the desired performance of the VRM.

Conventional VRMs are typically made from copper alloys and/or stainless steel. These materials are selected for their ratio of stiffness to yield strength, which determines a degree to which the deformable face can be deformed while still showing a full elastic recovery. In addition to increasing the mass of the VRM, these materials create a galvanic potential across the cooling medium, thereby resulting in corrosion and scale buildup within the cooling channels. Conventional VRMs are also machined to have sharp outer edges which define stress rising corners that may reduce the service life of the VRM.

Accordingly, there is a need in the art for an improved VRM that addresses these and other drawbacks and deficiencies associated with existing VRMs.

SUMMARY OF THE DISCLOSURE

In accordance with some non-limiting examples or aspects of the present disclosure, provided is an improved VRM that may include a mirror element including a deformable face having an outer surface with a reflective element. The deformable face may be deformable in response to a pressure applied by a pressure medium acting on an inner surface of the deformable face. The mirror element may further include a ring extending around a perimeter of the deformable face and protruding from the inner surface of the deformable face. The mirror element may further include at least one of: (A) a plurality of steps recessed into the inner surface of the deformable face, each of the plurality of steps recessed at a different depth relative to the inner surface of the deformable face; (B) a cooling cavity between the outer surface and the inner surface of the deformable face, the cooling cavity comprising a pair of manifolds fluidly connected to each other and each having a first curved end wall spaced apart from a second curved end wall; and (C) a sidewall of the ring having a curved inner surface and a curved outer surface.

In accordance with some non-limiting examples or aspects of the present disclosure, a VRM may have a base element and a mirror element connected to the base element with a pressure cavity defined between the base element and the mirror element. The mirror element may have a deformable face having an outer surface with a reflective element. The deformable face may be deformable in response to a pressure applied by a pressure medium within the pressure cavity acting on an inner surface of the deformable face. The mirror element may further have a ring extending around a perimeter of the deformable face and protruding from the inner surface of the deformable face. The mirror element may further have at least one of: (A) a plurality of steps recessed into the inner surface of the deformable face, each of the steps recessed relative to the inner surface of the deformable face at an increasing or decreasing depth in a direction away from a central axis; (B) a cooling cavity between the outer surface and the inner surface of the deformable face, the cooling cavity comprising a pair of manifolds each having a first curved end wall spaced apart from a second curved end wall, the manifolds fluidly connected to each other by a plurality of cooling channels extending through the first curved end wall of each manifold; and (C) a sidewall of the ring having a curved inner surface and a curved outer surface.

In accordance with some non-limiting examples or aspects of the present disclosure, a variable radius mirror may include a base element and a mirror element connected to the base element with a pressure cavity defined between the base element and the mirror element. The mirror element may include a deformable face having an outer surface with a reflective element. The deformable face may be deformable in response to a pressure applied by a pressure medium within the pressure cavity acting on an inner surface of the deformable face. The mirror element may further include a ring extending around a perimeter of the deformable face and protruding from the inner surface of the deformable face. A sidewall of the ring may have a curved inner surface and a curved outer surface. A plurality of steps may be recessed into the inner surface of the deformable face, with each of the steps being recessed at a different depth relative to the inner surface of the deformable face. A cooling cavity may be provided between the outer surface and the inner surface of the deformable face. The cooling cavity may include a pair of manifolds fluidly connected to each other and each having a first curved end wall spaced apart from a second curved end wall. The mirror element may be made from a metal material having an elastic modulus less than or equal to 100 GPa.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF THE DISCLOSURE

Figure 1:
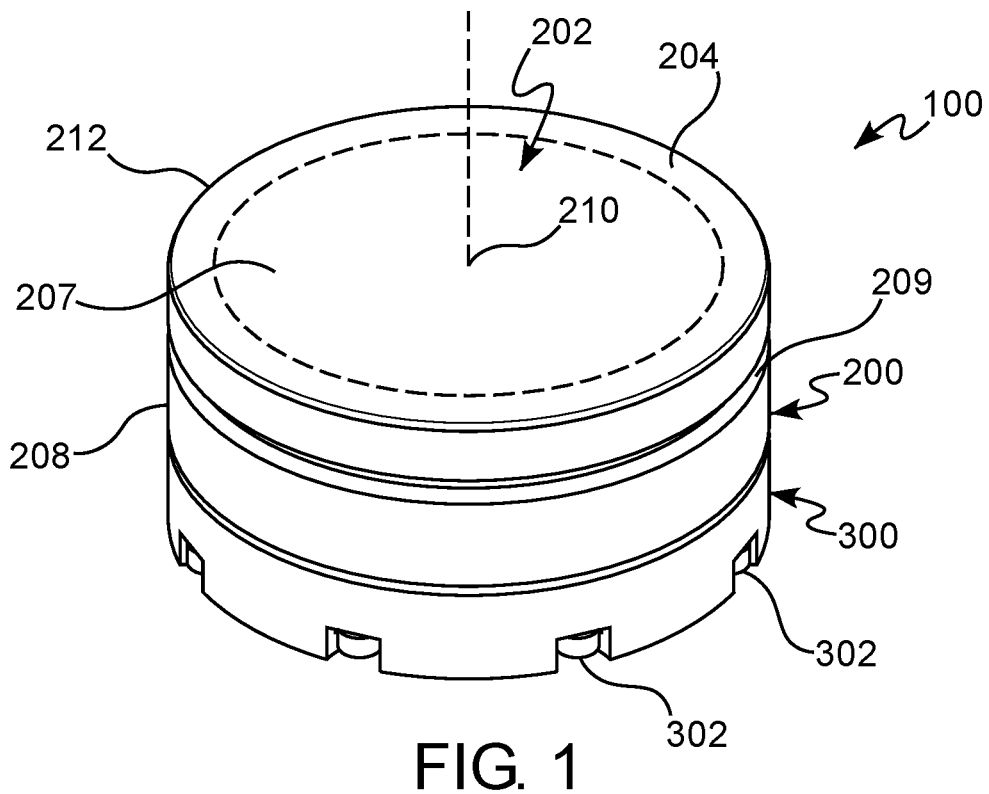
FIG. 1 is a top perspective view of a VRM in accordance with some non-limiting examples or aspects of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus ten percent of the stated value, such as plus or minus five percent of the stated value.

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "and/or" refers to both or either of two stated possibilities.

Figure 2:
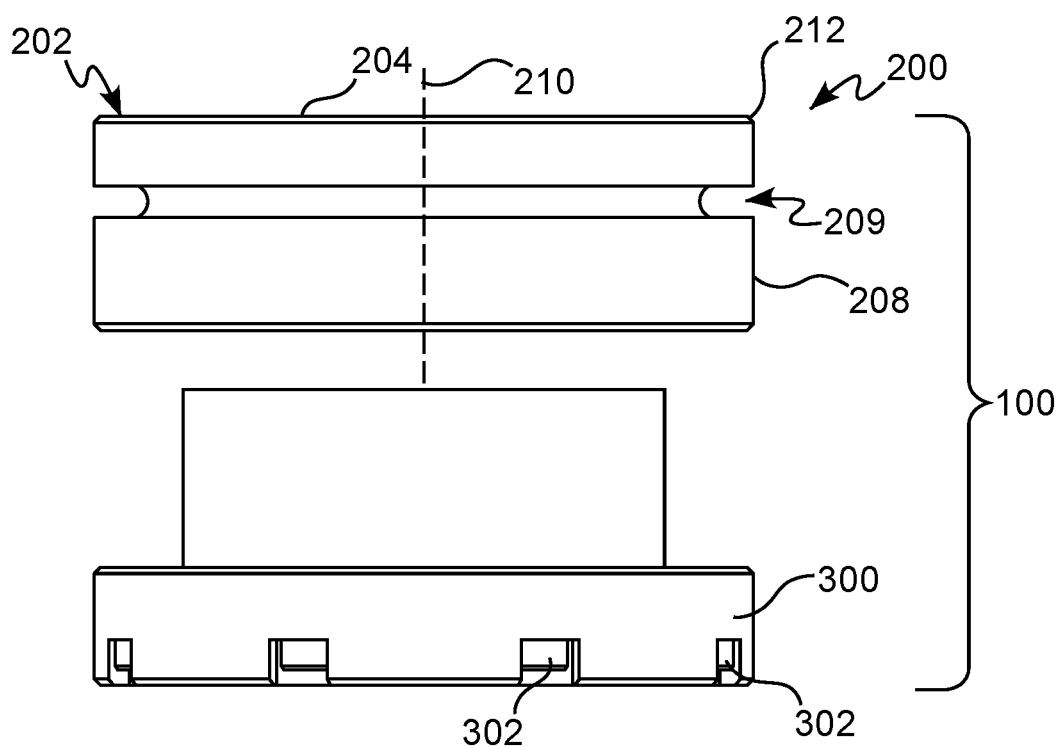
FIG. 2 is an exploded side view of the VRM shown in FIG. 1.

With initial reference to FIGS. 1-2, a variable radius mirror (VRM) 100 is shown in accordance with some examples or aspects of the present disclosure. The VRM 100 may be configured for use as an adaptive optic element in optical systems. For example, the VRM 100 may be used in industrial laser applications to control the convergence and/or divergence of a laser beam. The VRM 100 generally has a mirror element 200 and a base 300. The mirror element 200 may be removably connected to the base 300, such as using a plurality of fasteners 302. The mirror element 200 is configured to vary a focus point of the laser beam reflected from a reflective surface on the mirror element 200.

Figure 3:
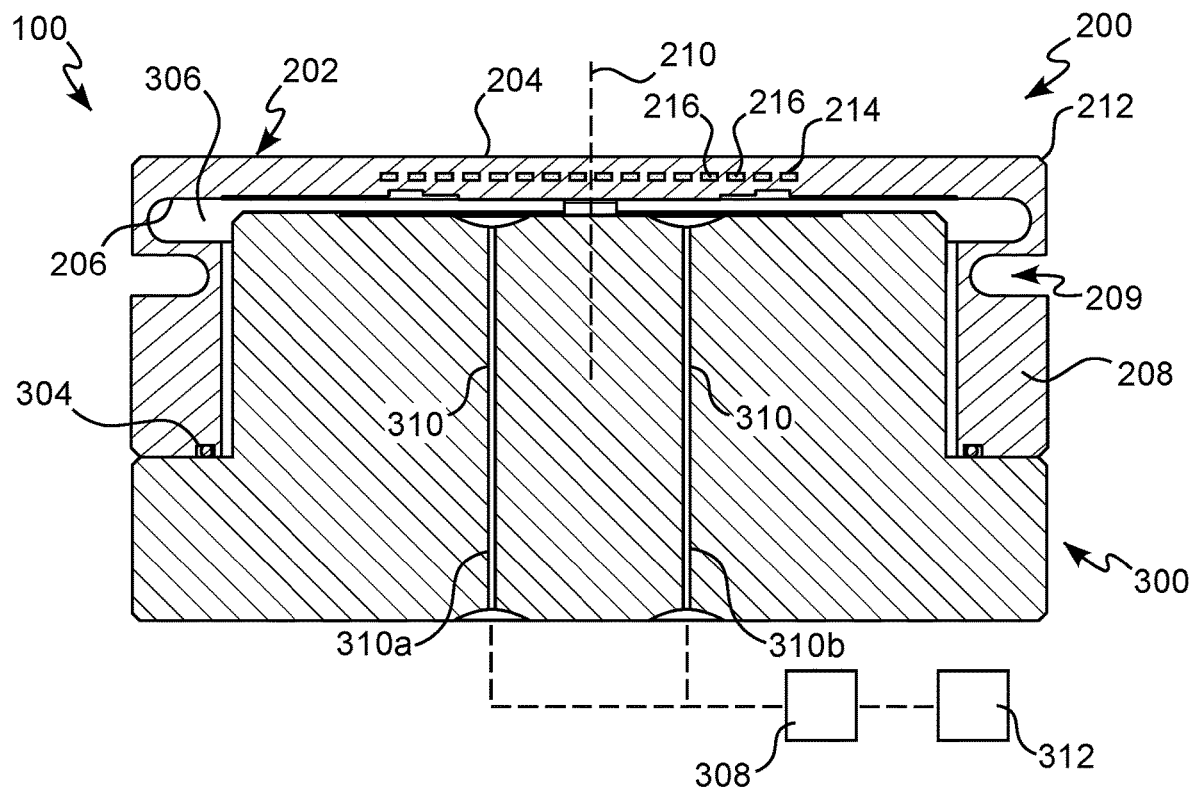
FIG. 3 is a first side cross-sectional view of the VRM shown in FIG. 1.
Figure 4:
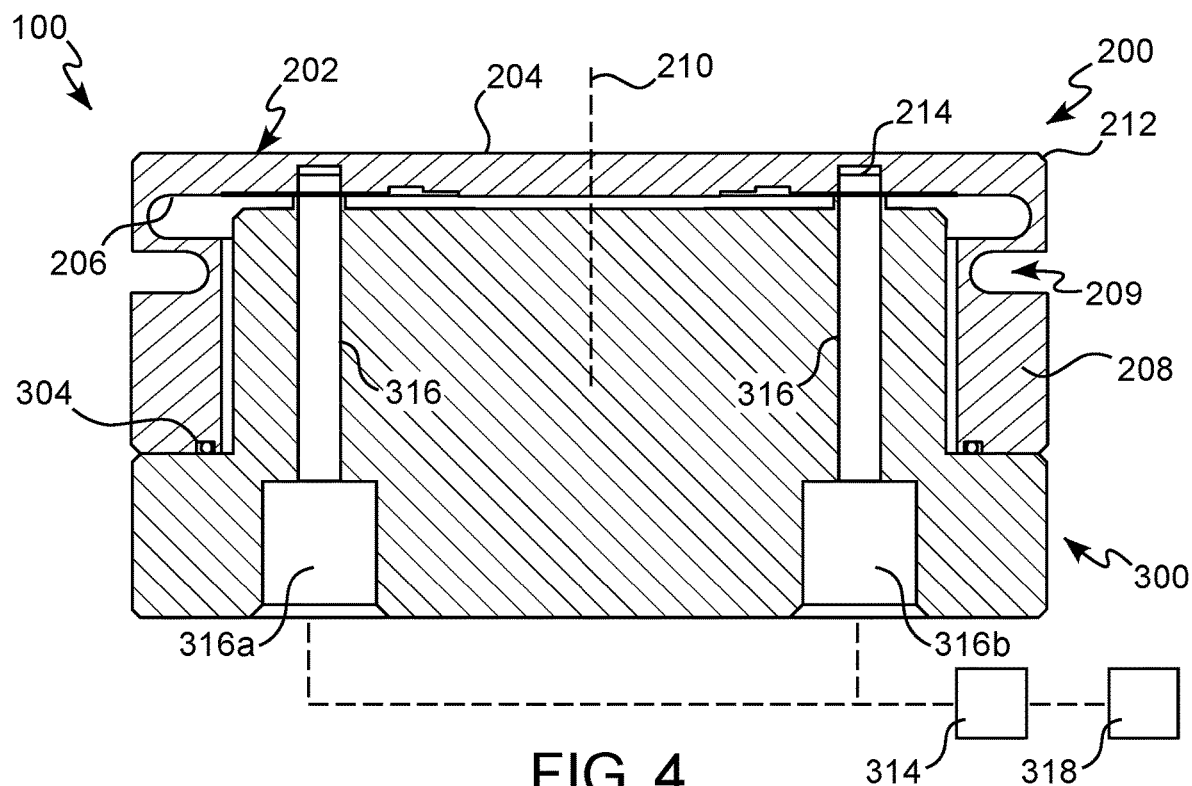
FIG. 4 is a second side cross-sectional view of the VRM shown in FIG. 1.

With continued reference to FIGS. 1-2, the mirror element 200 includes a deformable face 202 having an outer surface 204 and an inner surface 206 (shown in FIGS. 3-4). A reflective mirror surface or element 207 is positioned on at least a portion of the outer surface 204 and is configured to reflect the laser beam. The mirror element 200 is configured to vary a radius of curvature of the deformable face 202 by deflecting or flexing the deformable face 202 in a direction along a central axis 210 via selective actuation of an actuation mechanism, as described herein. Deflection of the deformable face 202 in turn changes a radius of curvature of the reflective element 207 to control the convergence, divergence, or collimation of the reflected laser beam. In some examples or aspects, the actuation mechanism for deflecting the deformable face 202 may be pressure applied by a pressure medium acting on the inner surface 206 of the deformable face 202. By varying the radius of curvature of the reflective element 207 via deflection of the deformable face 202, a focus point of a laser beam can be controlled to diverge the beam, converge the beam, or collimate the beam.

In some examples or aspects, the mirror element 200 has a circular cross-sectional shape. For example, as shown in FIG. 1, the deformable face 202 of the mirror element 200 has a circular shape with points along an outer edge of the deformable face 202 being substantially equidistant from a central axis 210. In other examples or aspects, the mirror element 200 may have an oval, elliptical, or oblong shape having one or more axes of symmetry. In such examples or aspects, the central axis 210 may define an approximate midpoint of the deformable face 202. In further examples or aspects, the mirror element 200 may have any other cross-sectional shape.

In some examples, the mirror element 200 may have a radius of 0.8 m concave to 0.8 m convex, with a usable clear aperture of 5% to 90% of a surface area of the deformable face 202. The size of the mirror element 200 is selected based on a desired application, such as the power of the laser beam or a desired focal length.

With reference to FIGS. 3-4, and with continued reference to FIGS. 1-2, the mirror element 200 has a ring 208 protruding away from the deformable face 202. In some examples or aspects, the ring 208 extends around a perimeter of the deformable face 202 and protrudes away from the inner surface 206. In examples or aspects where the deformable face 202 has a circular shape, the ring 208 is revolved around the central axis 210 and has a corresponding circular shape that is centered around the central axis 210 and extends from the inner surface 206 at or near an outer edge 212 of the deformable face 202. In examples or aspects where the deformable face 202 has an oval, elliptical, or oblong shape, the ring 208 has a corresponding oval, elliptical, or oblong shape that extends from to the inner surface 206 at or near the outer edge 212. In some examples or aspects, a sidewall defined by the ring 208 extends in a direction that is substantially perpendicular to a plane defined by the deformable face 202. In other examples or aspects, the sidewall defined by the ring 208 extends in an acute or obtuse angle relative to the plane defined by the deformable face 208. A groove 209 is cut into the ring 208. The groove 209 is continuous along an entire perimeter of the ring 208.

With continued reference to FIGS. 3-4, a pressure cavity 306 is defined between the mirror element 200 and the base 300. The pressure cavity 306 is in fluid communication with a pressure source 308 having a pressure medium that is used to pressurize the pressure cavity 306 in order to deform the deformable face 202. In some examples or aspects, the pressure medium is a gas (such as air), or a liquid. The mirror element 200 and the base 300 are connected together in a leak-proof manner to prevent escape of the pressure medium from the pressure cavity 306. For example, a gasket 304 may be provided at an interface between the ring 208 and the base 300.

With reference to FIG. 3, the base 300 has one or more passages 310 having a first end in fluid communication with the pressure source 308 and a second end in fluid communication with the pressure cavity 306. The pressure source 308 may include at least one of a storage tank for storing the pressure medium, a pump for pressurizing the pressure medium and/or delivering the pressure medium from the storage tank, and one or more fluid lines for delivering the pressure medium from the storage tank and/or the pump to the base 300. In addition, one or more valves may be provided to control the flow of the pressure medium between the pressure source 308 and the pressure cavity 306.

In some examples or aspects, the base 300 may have one or more inlet passages 310a for introducing the pressure medium from the pressure source 308 into the pressure cavity 306 and one or more outlet passages 310b for exhausting the pressure medium from the pressure cavity 306. In other examples or aspects, the base 300 may have a single passage 310 for introducing the pressure medium into the pressure cavity 306 and exhausting the pressure medium from the pressure cavity 306. One or more valves (not shown) may be provided to control the flow of the pressure medium into and out of the pressure cavity 308 via the one more passages 310.

With continued reference to FIG. 3, a pressure controller 312 controls the passage of pressure medium into and out of the pressure cavity 306. For example, the pressure controller 312 is configured to increase the pressure of the pressure medium within the pressure cavity 306 in order to increase a deflection of the deformable face 202 and change its radius of curvature or decrease the pressure of the pressure medium within the pressure cavity 306 in order to decrease a deflection of the deformable face 202. For example, the pressure controller 312 may control the output of a pump or other pressurization system used to pressurize the pressure medium and/or deliver the pressurized medium to the pressure cavity 306. Desirably, the pressure controller 312 is configured to control the pressure of the pressure medium within the pressure cavity 306 without introducing perturbations into the reflective surface of the reflective element 206 which would otherwise disturb focus of the laser beam. In some examples or aspects, the pressure controller 312 is configured to control the pressure within the pressure cavity 306 between 0 bar to 15 bar absolute pressure.

With continued reference to FIG. 3, the mirror element 200 has a cooling cavity 214 defined between the outer surface 204 and the inner surface 206 of the deformable face 202. The cooling cavity 214 is in fluid communication with a cooling medium source 314 having a cooling medium that is delivered to the cooling cavity 214 to cool the deformable face 202. In some examples or aspects, the cooling medium is a gas (such as air), or a liquid. The cooling cavity 214 has a plurality of cooling channels 216 configured for flowing the cooling medium therethrough.

With reference to FIG. 4, the base 300 has one or more cooling passages 316 having a first end in fluid communication with the cooling medium source 314 and a second end in fluid communication with the cooling cavity 214. The cooling medium source 314 may include at least one of a storage tank for storing the cooling medium, a pump for delivering the cooling medium from the storage tank, and one or more fluid lines for delivering the cooling medium from the storage tank and/or the pump to the base 300. In addition, one or more valves may be provided to control the flow of the cooling medium between the cooling medium source 314 and the cooling cavity 214.

In some examples or aspects, the base 300 may have one or more inlet cooling passages 316a for introducing the cooling medium into the cooling cavity 214 and one or more outlet cooling passages 316b for exhausting the cooling medium from the cooling cavity 214. A cooling controller 318 controls the passage of the cooling medium into and out of the cooling cavity 214. For example, the cooling controller 318 is configured to increase or decrease a flow rate and/or pressure of the cooling medium delivered to the cooling cavity 214 in order to increase or decrease a rate of heat dissipation from the deformable face 202. In some examples or aspects, the cooling controller 318 is configured to control the flow rate of the cooling medium delivered to the cooling cavity 214 between 0.01 L/min to 100 L/min. Desirably, the cooling controller 318 is configured to control the flow rate and/or pressure of the cooling medium flowing through the cooling cavity 214 without introducing perturbations into the reflective surface of the reflective element 207 which would otherwise disturb focus of the laser beam. In some examples or aspects, the pressure controller 312 and the cooling controller 318 may be combined into a single device.

With reference to FIGS. 5-10, a mirror element 200 is shown in accordance with another example or aspect of the present disclosure. Certain components of the mirror element 200 shown in FIGS. 1-4 are substantially similar or identical to the components of the mirror element 200 described herein with reference to FIGS. 5-10. Accordingly, reference numerals in FIGS. 5-10 are used to illustrate similar or identical components of the corresponding reference numerals in FIGS. 1-4. As the previous discussion regarding the mirror element 200 generally shown in FIGS. 1-4 is applicable to the mirror element 200 shown in FIGS. 5-10, only the relative differences between the two mirror elements 200 are discussed hereinafter.

Figure 5:
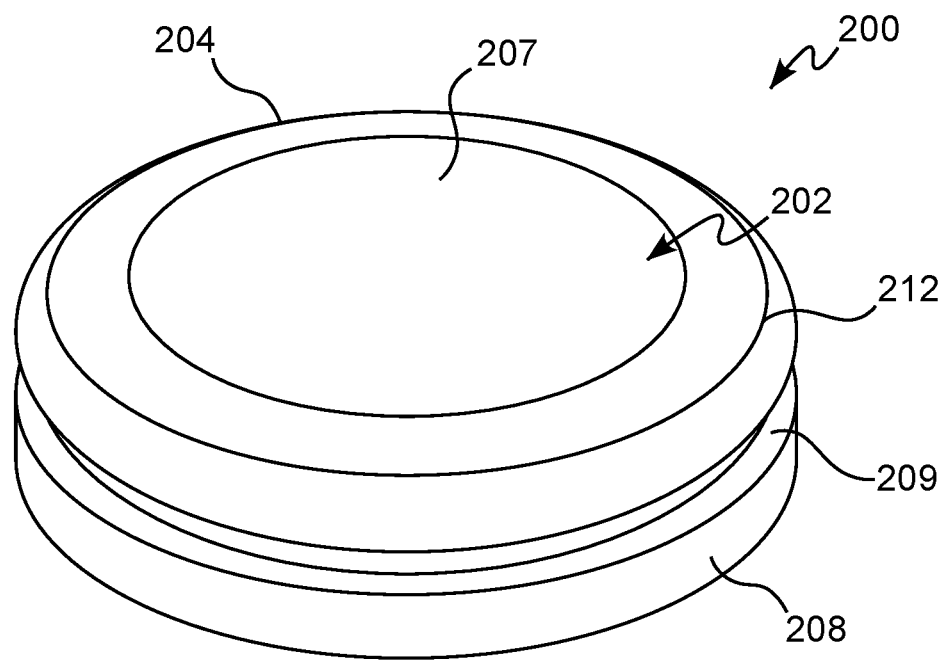
FIG. 5 is top perspective view of a mirror element for use with a VRM in accordance with some non-limiting examples or aspects of the present disclosure.
Figure 6:
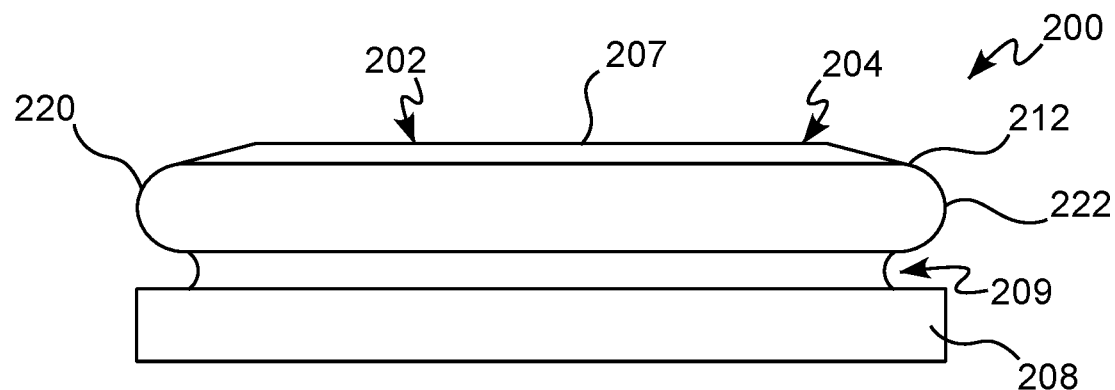
FIG. 6 is a side view of the mirror element shown in FIG. 5.

With reference to FIGS. 5-6, the ring 208 of the mirror element 200 has a sidewall 220 with a curved outer surface 222 extending from an edge 212 of the deformable face 202. The curved outer surface 222 may have a constant radius of curvature or a variable radius of curvature. In some examples or aspects, the curved outer surface 222 has a first end starting at the edge 212 of the deformable face 202 and a second end terminating at the groove 209 on the ring 208.

Figure 9:
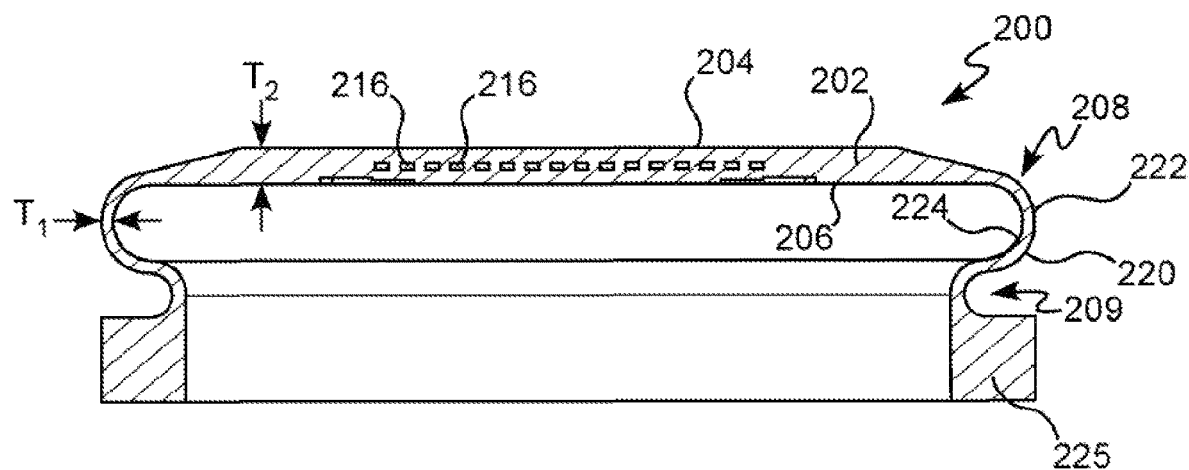
FIG. 9 is a side cross-sectional view of the mirror element shown in FIG. 5.

With reference to FIG. 9, the sidewall 220 further may have a curved inner surface 224. The sidewall 220 thus may have a shape of an outer surface of a toroid. The curved inner surface 224 may have a constant radius of curvature or a variable radius of curvature. In some examples or aspects, the curved inner surface 224 has a first end starting at an outer edge of the inner surface 206 of the deformable face 202 and a second end terminating at the groove 209 on the ring 208.

In some examples or aspects, the curved inner surface 224 may have the same shape as the curved outer surface 222 such that the sidewall 220 has a constant or uniform thickness $T_1$ at least in the area between the curved outer surface 222 and the curved inner surface 224. In other examples or aspects, the thickness of the sidewall 220 may increase or decrease (i.e., thickness $T_1$ may be non-uniform) in a direction from the edge 212 of the deformable face 202 toward the groove 209 on the ring 208. A lower portion 225 of the sidewall 220 below the groove 209 may have an increased thickness compared to the thickness the sidewall 220 above the groove 209.

The curved sidewall 220 is configured to distribute the stress of deformation across a broad curve instead of focusing the stress in one or more corners with a tight radius. In addition, the curved sidewall 220 enables maximum deformation of the deformable face 202 even when the mirror element 200 is made from a material with a lower yield point. For example, with the mirror element 200, including the deformable face 202 and the ring 208, is made from a metal material with an elastic modulus less than or equal to 100 GPa, the deformable face 202 can be deformed to a greater degree (i.e., have a larger radius of curvature) while still showing a full elastic recovery. Furthermore, stresses on the deformable face 202 from connecting the mirror element 200 onto the base 300 (shown in FIGS. 1-2), such as due to errors in the mounting surface and torque variations between the fasteners, are absorbed by the curved sidewall 220, thereby allowing the mirror element 200 to be manufactured independently of a matched base 300.

In some examples or aspects, the mirror element 200 shown in FIGS. 1-10 is made from a metal material having an elastic modulus that is less than or equal to 100 GPa. For example, the mirror element 200 may be made from aluminum or an aluminum alloy. Use of aluminum allows for a reduction in weight of the mirror element 200 compared to use of conventional materials, such as stainless steel and/or copper. Lower weight in turn contributes to a faster movement of the deformable face 202, thereby increasing the performance response of the mirror element 200.

In contrast to conventional VRMs, which have mirror elements made from metal materials with an elastic modulus greater than 100 GPa (i.e., stainless steel and copper), the mirror element 200 made from a metal material with an elastic modulus less than or equal to 100 GPa allows for a greater deformation of the deformable face 202 while still showing a full elastic recovery. In addition, when used with VRMs having a cooling cavity, the aluminum or aluminum alloy does not create a galvanic potential across the cooling medium, thereby preventing corrosion and scale buildup within the cooling channels.

With reference to FIG. 9, the deformable face 202 may have a thickness $T_2$ of 0.5 mm to 30.0 mm measured between the outer surface 204 and the inner surface 206. The use of aluminum allows for a thicker deformable face 202 compared to a thickness of the deformable face used in conventional mirror elements (0.8 mm to 2.9 mm) while allowing a full range of deformation. With a thicker deformable face 202, deeper cooling channels can be easily machined to increase the cooling capacity. In addition, increased thickness of the deformable face 202 allows for easier fixturing and machining of the mirror element 200 during manufacture.

Figure 7:
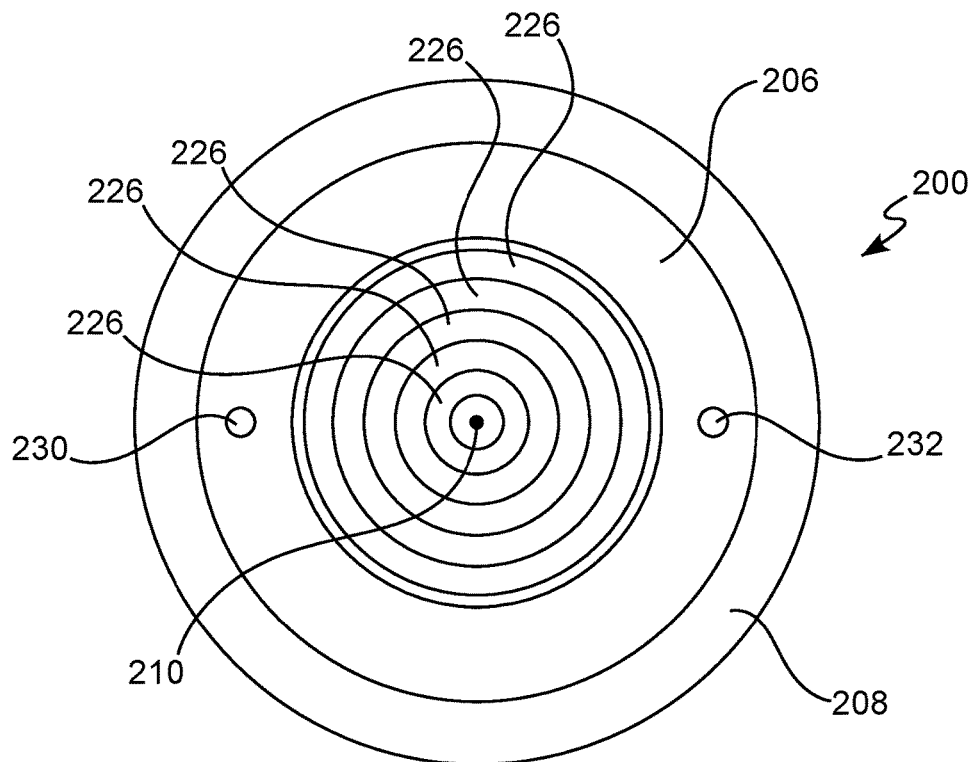
FIG. 7 is a bottom view of the mirror element shown in FIG. 5.
Figure 8:
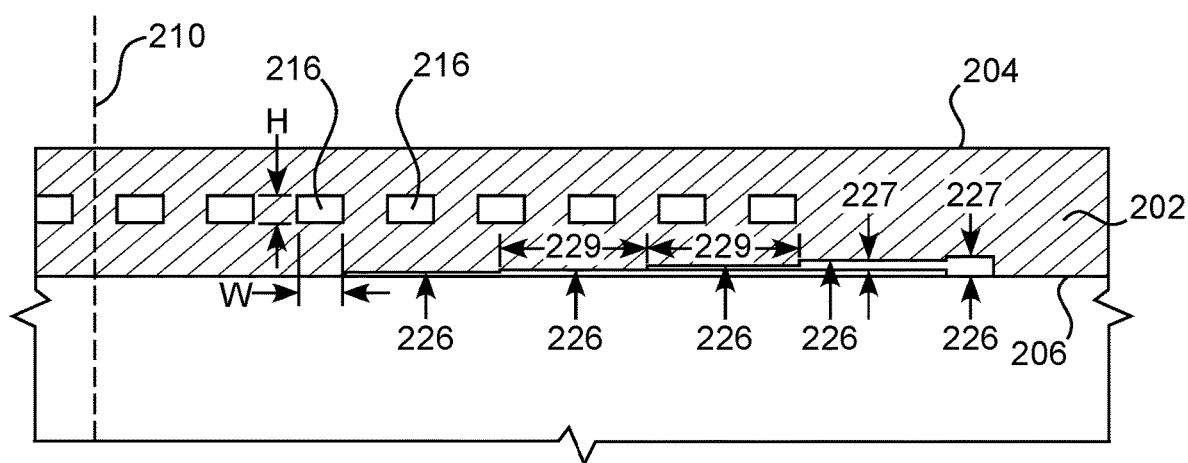
FIG. 8 is a detailed cross-sectional view of a plurality of steps on an inner surface of the mirror element shown in FIG. 5.

With reference to FIGS. 7-8, the mirror element 200 has one or more steps 226 recessed into the inner surface 206 of the deformable face 202. Each step 226 has a rise 227, expressed as a distance measured in a direction along the central axis 210, and a run 229, expressed as a distance measured in a direction perpendicular to the central axis 210. Each step 226 may have the same rise 227 as the other steps 226 or a different rise 227 relative to the other steps. The rise 227 may be substantially parallel to the central axis 210 or angled at an obtuse or acute angle relative to the central axis 210.

Regardless of the rise 227, the steps 226 are recessed at a different depth relative to the inner surface 206. The depth of the steps 226 may increase and/or decrease in a direction away from the central axis 210. For example, the depth of each step 226 may increase in a direction away from the central axis 210, decrease in the direction away from the central axis 210, or the depth of at least one of a plurality of steps 226 may increase while a depth of at least another one of the plurality of steps 226 decreases in the direction away from the central axis 210. As shown in FIG. 8, the depth of the steps 226 continuously increases in a direction away from the central axis 210. The step 226 closest to the central axis 210 may be in the same plane as the inner surface 206 or recessed relative to the plane defined by the inner surface 206.

In some examples or aspects, such as shown in FIG. 7, the steps 226 may be formed as a series of concentric rings centered about the central axis 210. Each step 226 may have the same run 229 as the other steps 226 or a different run 229 relative to the other steps. The run 229 or width of the steps 226 may increase and/or decrease in a direction away from the central axis 210. For example, the run 229 or width of each step 226 may increase in a direction away from the central axis 210, decrease in the direction away from the central axis 210, or the run 229 of at least one of a plurality of steps 226 may increase while a run 229 of at least another one of the plurality of steps 226 decreases in the direction away from the central axis 210. The run 229 may be substantially perpendicular to the central axis 210 or angled at an obtuse or acute angle relative to the central axis 210.

The steps 226 may be continuous or discontinuous in a circumferential direction about the central axis 210.

The steps 226 may be added during manufacture of the mirror element 200 to correct any irregularities on the outer surface 204 which may prevent deformation of the deformable face 202 in a spherical or torroidal manner. The steps 226 may be added to correct the figure of the deformed outer surface 204 away from the natural catenary shape to an optically-desirable spherical shape. The steps 226 can be easily machined into the inner surface 206 of the deformable face 202. A mirror element 200 having the steps 226 on the inner surface 206 of the deformable face 202 can be mounted on a fixturing tool, such as a vacuum chuck, having corresponding steps. In this manner, vibrations of the outer surface 204 of the deformable face 202 during machining can be minimized or eliminated The geometry of the steps 226 is independent of the thickness and material of the deformable face 202, thereby permitting use of the steps 226 on any deformable face of sufficient thickness as long as the steps do not cause a stress rise above the yield point of the material.

Figure 10:
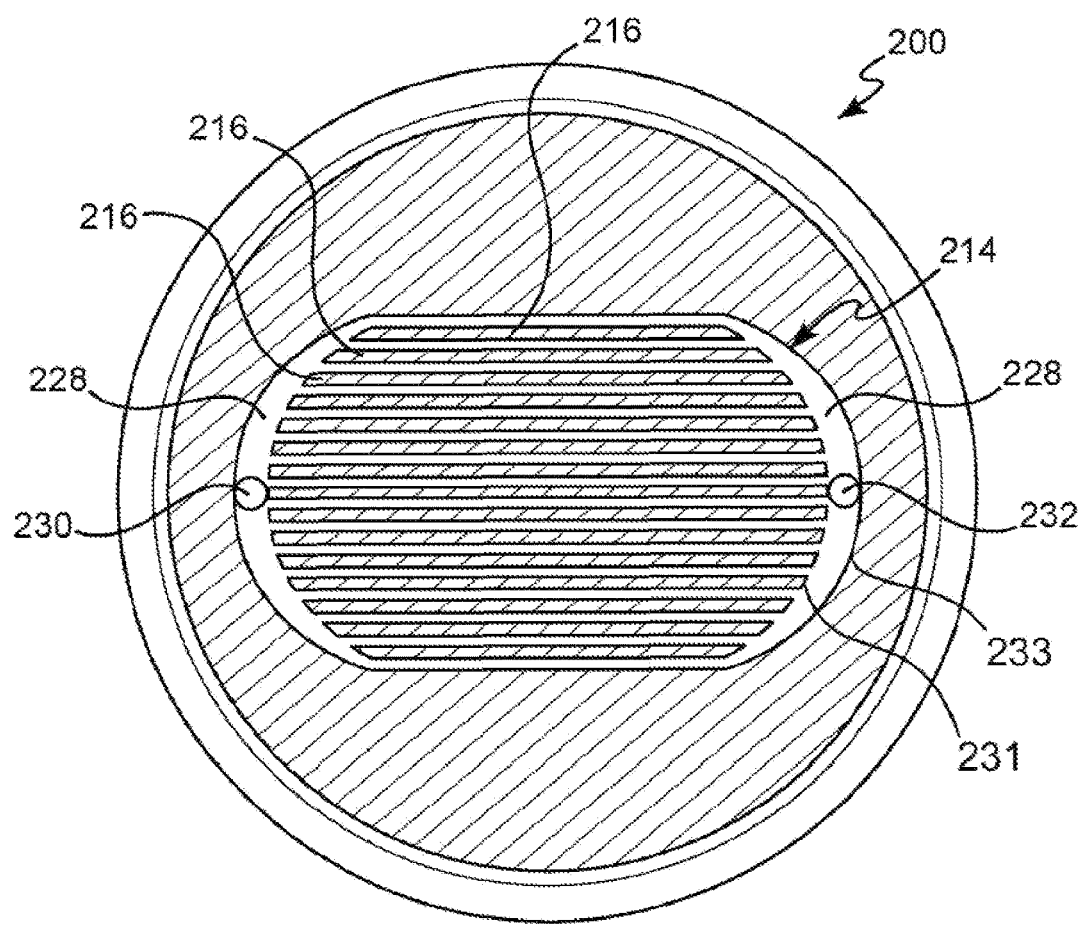
FIG. 10 is a side cross-sectional view of the mirror element shown in FIG. 5.

With reference to FIG. 10, the cooling cavity 214 has a pair of manifolds 228 fluidly connected to each other by the plurality of cooling channels 216. Each manifold 228 has a first curved end wall 231 spaced apart from a second curved end wall 233, with each of the cooling channels 216 extending through the first curved end wall 231 of each manifold 228. In some examples or aspects, a curvature of the first curved end wall 231 and/or the second curved wall 233 may be selected to correspond to a curvature of the outer surface of the mirror element 200.

The cooling cavity 214 is in fluid communication with a cooling medium source 314 (shown in FIG. 4) via at least one cooling cavity inlet 230 and at least one cooling cavity outlet 232. The at least one cooling cavity inlet 230 may be provided in a first of the pair of manifolds 228 and at least one cooling cavity outlet 232 may be provided in a second of the pair of manifolds 228.

With continued reference to FIG. 10, the plurality of cooling channels 216 that fluidly connect the pair of manifolds 228 may be arranged substantially parallel to each other. The length of the cooling channels 216 depends on the shape of the manifolds 228. For example, as shown in FIG. 10, cooling channels 216 that are radially closer to an edge of the mirror element 200 are shorter than the cooling channels 216 that are closer to the middle of the mirror element 200 due to the curved shape of the manifolds 228. In this manner, the longer cooling channels have a larger heat absorption rate compared to the shorter cooling channels 216 due to their larger surface area.

An efficient cooling medium flow within the cooling cavity 214 reduces thermal gradients across the deformable face 202 and irregularities in the mirror surface which can impact the desired performance of the VRM 100.

As shown in FIG. 8, each cooling channel 216 has a width W and a height H. The width W and height H of the cooling channels 216 may be uniform. In some examples of aspects, the width W and height H of the cooling channels 216 may vary across the surface of the deformable face 202. Cooling channels 216 may be provided as close as possible to the outer surface 204 of the deformable face 202 in order to increase heat transfer and enable increased radius of curvature.

An increased thickness T2 of the deformable face 202 allows for wider and deeper cooling channels 216, thereby increasing the flow rate of the cooling medium at a given pressure. The flow rate is further improved and regulated by the curved shape of the manifolds 228 which urge the cooling medium along the curved walls and into the cooling channels 216.

Further examples or aspects of a variable radius mirror are detailed in the following numbered clauses.

Clause 1. A variable radius mirror comprising: a mirror element comprising: a deformable face having an outer surface with a reflective element, the deformable face being deformable in response to a pressure applied by a pressure medium acting on an inner surface of the deformable face; a ring extending around a perimeter of the deformable face and protruding from the inner surface of the deformable face; and at least one of: a plurality of steps recessed into the inner surface of the deformable face, each of the plurality of steps recessed at a different depth relative to the inner surface of the deformable face; a cooling cavity between the outer surface and the inner surface of the deformable face, the cooling cavity comprising a pair of manifolds fluidly connected to each other and each having a first curved end wall spaced apart from a second curved end wall; and a sidewall of the ring having a curved inner surface and a curved outer surface.

Clause 2. The variable radius mirror according to clause 1, wherein the plurality of steps are formed as a plurality of concentric rings centered about a central axis Clause 3. The variable radius mirror according to clause 1 or 2, wherein the depth of the plurality of steps decreases in a direction away from a central axis.

Clause 4. The variable radius mirror according to any of clauses 1-3, wherein the depth of the plurality of steps increases in a direction away from a central axis.

Clause 5. The variable radius mirror according to any of clauses 1-4, wherein a width of the plurality of steps measured along the inner surface of the deformable face increases or decreases in a direction away from a central axis, or wherein the width of at least one of the plurality of steps increases while the width of at least another one of the plurality of steps decreases in the direction away from the central axis.

Clause 6. The variable radius mirror according to any of clauses 1-5, wherein the cooling cavity further comprises at least one cooling inlet in a first of the pair of manifolds and at least one cooling outlet in a second of the pair of manifolds.

Clause 7. The variable radius mirror according to any of clauses 1-6, wherein the cooling cavity further comprises a plurality of cooling channels fluidly connecting the pair of manifolds.

Clause 8. The variable radius mirror according to clause 7, wherein each of the cooling channels extends through the first curved end wall of each manifold.

Clause 9. The variable radius mirror according to clause 7 or 8, wherein the plurality of cooling channels are parallel to each other.

Clause 10. The variable radius mirror according to any of clauses 1-9, wherein a thickness of the sidewall between the curved inner surface and the curved outer surface is uniform.

Clause 11. The variable radius mirror according to any of clauses 1-10, wherein the sidewall of the ring is shaped as an outer surface of a toroid.

Clause 12. The variable radius mirror according to any of clauses 1-11, wherein the mirror element is made from a metal material having an elastic modulus less than or equal to 100 GPa.

Clause 13. The variable radius mirror according to any of clauses 1-12, wherein the mirror element is made from aluminum or an aluminum alloy.

Clause 14. The variable radius mirror according to any of clauses 1-13, further comprising a base element connected to the ring of the mirror element, and a pressure cavity defined between the mirror element and the base element.

Clause 15. The variable radius mirror according to clause 14, wherein the base element has at least one passage in fluid communication with the pressure cavity.

Clause 16. A variable radius mirror comprising: a base element; and a mirror element connected to the base element with a pressure cavity defined between the base element and the mirror element, the mirror element comprising: a deformable face having an outer surface with a reflective element, the deformable face being deformable in response to a pressure applied by a pressure medium within the pressure cavity acting on an inner surface of the deformable face; a ring extending around a perimeter of the deformable face and protruding from the inner surface of the deformable face; and at least one of: a plurality of steps recessed into the inner surface of the deformable face, each of the steps recessed relative to the inner surface of the deformable face at an increasing or decreasing depth in a direction away from a central axis; a cooling cavity between the outer surface and the inner surface of the deformable face, the cooling cavity comprising a pair of manifolds each having a first curved end wall spaced apart from a second curved end wall, the manifolds fluidly connected to each other by a plurality of cooling channels extending through the first curved end wall of each manifold; and a sidewall of the ring having a curved inner surface and a curved outer surface.

Clause 17. The variable radius mirror according to clause 16, wherein the mirror element is made from a metal material having an elastic modulus less than or equal to 100 GPa.

Clause 18. The variable radius mirror according to clause 16 or 17, wherein the base element has at least one passage in fluid communication with the pressure cavity.

Clause 19. The variable radius mirror according to any of clauses 16-18, wherein the cooling cavity further comprises at least one cooling inlet in a first of the pair of manifolds and at least one cooling outlet in a second of the pair of manifolds.

Clause 20. A variable radius mirror comprising: a base element; and a mirror element connected to the base element with a pressure cavity defined between the base element and the mirror element, the mirror element comprising: a deformable face having an outer surface with a reflective element, the deformable face being deformable in response to a pressure applied by a pressure medium within the pressure cavity acting on an inner surface of the deformable face; a ring extending around a perimeter of the deformable face and protruding from the inner surface of the deformable face, a sidewall of the ring having a curved inner surface and a curved outer surface; a plurality of steps recessed into the inner surface of the deformable face, each of the steps recessed at a different depth relative to the inner surface of the deformable face; and a cooling cavity between the outer surface and the inner surface of the deformable face, the cooling cavity comprising a pair of manifolds fluidly connected to each other and each having a first curved end wall spaced apart from a second curved end wall, wherein the mirror element is made from a metal material having an elastic modulus less than or equal to 100 GPa.

Although the disclosure describes what are currently considered to be the most practical and preferred examples or aspects, it is to be understood that such detail is solely for that purpose and that the disclosure is not limited to the disclosed examples or aspects, but, on the contrary, is intended to cover modifications and equivalent arrangements that are within the spirit and scope of the appended claims. For example, it is to be understood that the present disclosure contemplates that, to the extent possible, one or more features of any example or aspect can be combined with one or more features of any other example or aspect.

What is claimed is:

1. A variable radius mirror comprising:
    a mirror element comprising:
        a deformable face comprising:
            an outer surface that is reflective; and
            an inner surface that opposes the outer surface, the inner surface comprising:
                a central surface centered on a central axis of the variable radius mirror and extending in a plane;
                a peripheral surface extending in the plane; and
                a plurality of steps between the central surface and the peripheral surface that are entirely recessed from the central surface and the peripheral surface towards the outer surface; and
        a ring extending around a perimeter of the deformable face and protruding from the inner surface of the deformable face,
    wherein the deformable face is configured to deform when a pressure from a controlled pressure source is applied to the inner surface, and
    wherein each of the plurality of steps are recessed at different depths relative to the inner surface of the deformable face.

2. The variable radius mirror according to claim 1, wherein the plurality of steps are formed as a plurality of concentric rings centered about a central axis.

3. The variable radius mirror according to claim 1, wherein the different depths decrease in a direction away from a central axis.

4. The variable radius mirror according to claim 1, wherein the different depths increase in a direction away from a central axis.

5. The variable radius mirror according to claim 1, wherein a width of the plurality of steps measured along the inner surface of the deformable face increases or decreases in a direction away from a central axis, or wherein the width of at least one of the plurality of steps increases while the width of at least another one of the plurality of steps decreases in the direction away from the central axis.

6. The variable radius mirror according to claim 1, wherein the mirror element is made from a metal material having an elastic modulus less than or equal to 100 GPa.

7. The variable radius mirror according to claim 6, wherein the metal material is aluminum or an aluminum alloy.

8. The variable radius mirror according to claim 1, further comprising a base element connected to the ring of the mirror element, and a pressure cavity defined between the mirror element and the base element.

9. The variable radius mirror according to claim 8, wherein the base element has at least one passage in fluid communication with the pressure cavity.

10. The variable radius mirror according to claim 8,
    wherein a sidewall of the ring has a curved inner surface and a curved outer surface; and
    wherein the mirror element comprises a cooling cavity between the outer surface and the inner surface of the deformable face, the cooling cavity comprising a pair of manifolds fluidly connected to each other and each having a first curved end wall spaced apart from a second curved end wall.

11. The variable radius mirror according to claim 1, wherein the mirror element comprises a cooling cavity between the outer surface and the inner surface of the deformable face, the cooling cavity comprising a pair of manifolds fluidly connected to each other and each having a first curved end wall spaced apart from a second curved end wall.

12. The variable radius mirror according to claim 11, wherein the cooling cavity further comprises at least one cooling inlet in a first manifold of the pair of the manifolds and at least one cooling outlet in a second manifold of the pair of the manifolds.

13. The variable radius mirror according to claim 11, wherein the cooling cavity further comprises a plurality of cooling channels fluidly connecting the pair of the manifolds.

14. The variable radius mirror according to claim 13, wherein each of the cooling channels extends through the first curved end wall of each the pair of the manifolds.

15. The variable radius mirror according to claim 13, wherein the plurality of cooling channels are parallel to each other.

16. The variable radius mirror according to claim 11, further comprising a base element;
wherein the mirror element is connected to the base element with a pressure cavity defined between the base element and the mirror element,
wherein each of the plurality of steps is recessed relative to the inner surface of the deformable face at an increasing or decreasing amount of the different depths in a direction away from a central axis; and
wherein the manifolds are fluidly connected to each other by a plurality of cooling channels extending through the first curved end wall of each the pair of the manifolds.

17. The variable radius mirror according to claim 16, wherein the mirror element is made from a metal material having an elastic modulus less than or equal to 100 GPa.

18. The variable radius mirror according to claim 16, wherein the base element has at least one passage in fluid communication with the pressure cavity.

19. The variable radius mirror according to claim 16, wherein the cooling cavity further comprises at least one cooling inlet in a first manifold of the pair of the manifolds and at least one cooling outlet in a second manifold of the pair of the manifolds.

20. The variable radius mirror according to claim 1, wherein a sidewall of the ring has a curved inner surface and a curved outer surface.

21. The variable radius mirror according to claim 20, wherein a thickness of the sidewall between the curved inner surface and the curved outer surface is uniform.

22. The variable radius mirror according to claim 20, wherein the sidewall of the ring is shaped as an outer surface of a toroid.

23. The variable radius mirror according to claim 1, wherein the central surface of the inner surface and the peripheral surface of the inner surface are inner most surfaces of the deformable face.

24. A variable radius mirror comprising:
a mirror element comprising:
a deformable face comprising:
an outer surface that is reflective; and
an inner surface that opposes the outer surface, wherein the deformable face is configured to deform when a pressure from a controlled pressure source is applied to the inner surface, the inner surface comprising:
a central surface centered on a central axis of the variable radius mirror and extending in a plane;
a peripheral surface extending the plane;
a plurality of steps between the central surface and the peripheral surface that are entirely recessed from the central surface and the peripheral surface towards the outer surface; and
a cooling cavity between the outer surface and the inner surface, the cooling cavity comprising a pair of manifolds fluidly connected to each other and each having a first curved end wall spaced apart from a second curved end wall; and
a ring extending around a perimeter of the deformable face and protruding from the inner surface of the deformable face.

25. The variable radius mirror according to claim 24, wherein the cooling cavity further comprises at least one cooling inlet in a first manifold of the pair of the manifolds and at least one cooling outlet in a second manifold of the pair of the manifolds.

26. The variable radius mirror according to claim 24, wherein the cooling cavity further comprises a plurality of cooling channels fluidly connecting the pair of the manifolds.

27. The variable radius mirror according to claim 26, wherein each of the cooling channels extends through the first curved end wall of each manifold of the pair of the manifolds.

28. The variable radius mirror according to claim 26, wherein the plurality of cooling channels are parallel to each other.

* * * * *